United States Patent
Fujiwara et al.

(10) Patent No.: US 12,301,991 B2
(45) Date of Patent: May 13, 2025

(54) OUTPUTTING INFORMATION IN A CASE IN WHICH A FOCUS EVALUATION VALUE OF THE LATEST FRAME EXCEEDS AN ALLOWABLE VALUE SET BASED ON THE MAXIMUM EVALUATION VALUE DURING A MANUAL FOCUS PERIOD

(71) Applicant: FUJIFILM Corporation, Tokyo (JP)

(72) Inventors: Shinya Fujiwara, Saitama (JP); Takehiro Koguchi, Saitama (JP); Taro Saito, Saitama (JP); Yukinori Nishiyama, Saitama (JP); Tomoharu Shimada, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 158 days.

(21) Appl. No.: 18/165,657

(22) Filed: Feb. 7, 2023

(65) Prior Publication Data

US 2023/0188849 A1  Jun. 15, 2023

Related U.S. Application Data

(63) Continuation of application No. PCT/JP2021/030190, filed on Aug. 18, 2021.

(30) Foreign Application Priority Data

Aug. 25, 2020  (JP) ................................ 2020-141656

(51) Int. Cl.
*H04N 5/335* (2011.01)
*G06F 3/14* (2006.01)
(Continued)

(52) U.S. Cl.
CPC ............ *H04N 23/675* (2023.01); *G06F 3/14* (2013.01); *G06T 5/50* (2013.01); *G06T 7/13* (2017.01);
(Continued)

(58) Field of Classification Search
CPC ................................................... H04N 23/675
See application file for complete search history.

(56) References Cited

U.S. PATENT DOCUMENTS 7,889,270 B2 * 2/2011 Yamada ................. H04N 23/67
348/346
8,040,408 B2 * 10/2011 Date .................... H04N 23/673
348/625
(Continued)

FOREIGN PATENT DOCUMENTS

JP  2005-278053 A  10/2005
JP  2007-60328 A  3/2007
(Continued)

OTHER PUBLICATIONS

International Preliminary Report on Patentability for International Application No. PCT/JP2021/030190, dated Aug. 4, 2022, with an English translation.
(Continued)

*Primary Examiner* — Gary C Vieaux
(74) *Attorney, Agent, or Firm* — Birch, Stewart, Kolasch & Birch, LLP

(57) ABSTRACT

An image processing apparatus includes a processor (16) and a memory, in which the processor (16) performs processing of generating first moving image data for recording based on input imaging data, processing of setting a specific subject region including a specific subject in an imaging region represented by the imaging data or the first moving image data, processing of evaluating a focus state based on the imaging data or the first moving image data, processing of generating second moving image data for display in which a focus state of the specific subject region is visually recognizable based on data of the specific subject region, an evaluation result of the focus state, and the first moving (Continued)

image data, and processing of outputting the second moving image data to a display destination.

15 Claims, 12 Drawing Sheets

(51) Int. Cl.
  *G06T 5/50* (2006.01)
  *G06T 7/13* (2017.01)
  *G06T 7/20* (2017.01)
  *G06V 10/56* (2022.01)
  *H04N 23/67* (2023.01)
(52) U.S. Cl.
  CPC ............... *G06T 7/20* (2013.01); *G06V 10/56* (2022.01); *G06T 2207/10024* (2013.01); *G06T 2207/20104* (2013.01); *G06T 2207/20192* (2013.01); *G06T 2207/20221* (2013.01)

(56) References Cited

U.S. PATENT DOCUMENTS

| | | | | |
|---|---|---|---|---|
| 8,330,850 | B2* | 12/2012 | Miura | H04N 23/635 |
| | | | | 348/346 |
| 10,148,844 | B2* | 12/2018 | Okamoto | H04N 1/212 |
| 10,587,811 | B2* | 3/2020 | Ise | H04N 23/632 |
| 2007/0052836 | A1 | 3/2007 | Yamada et al. | |
| 2009/0231454 | A1 | 9/2009 | Miura | |
| 2009/0237523 | A1 | 9/2009 | Date et al. | |
| 2017/0264773 | A1 | 9/2017 | Okamoto et al. | |
| 2019/0182432 | A1 | 6/2019 | Ise | |

FOREIGN PATENT DOCUMENTS

| | | |
|---|---|---|
| JP | 2009-219020 A | 9/2009 |
| JP | 2009-231918 A | 10/2009 |
| JP | 2014-89268 A | 5/2014 |
| JP | 2016-57349 A | 4/2016 |
| JP | 2017-169188 A | 9/2017 |
| JP | 2018-6995 A | 1/2018 |
| JP | 2019-105768 A | 6/2019 |

OTHER PUBLICATIONS

International Search Report for International Application No. PCT/JP2021/030190, dated Nov. 16, 2021, with an English translation.
Written Opinion of the International Searching Authority for International Application No. PCT/JP2021/030190, dated Nov. 16, 2021.

* cited by examiner

FIG. 4
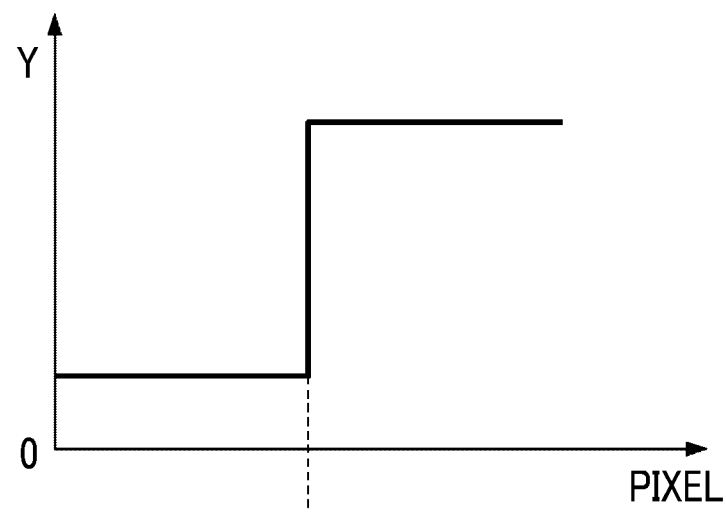
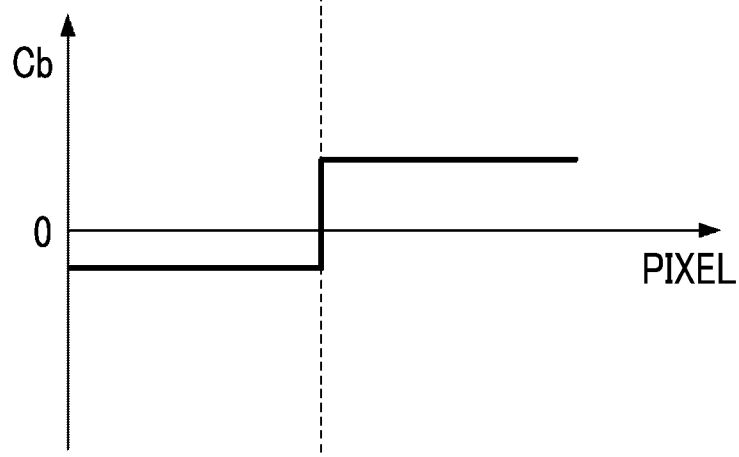
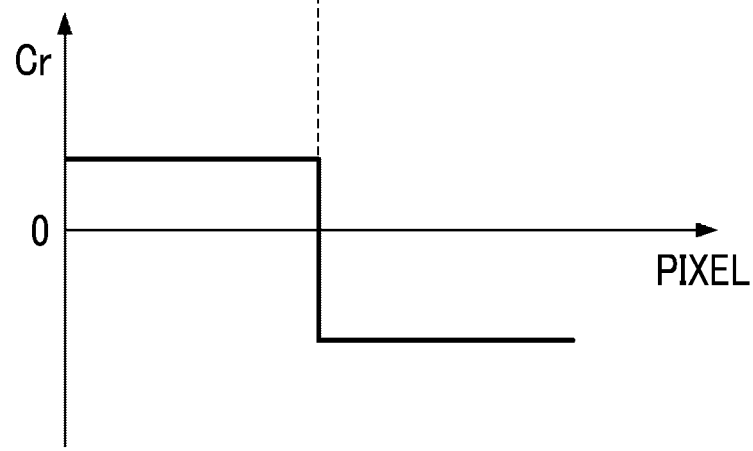

FIG. 5
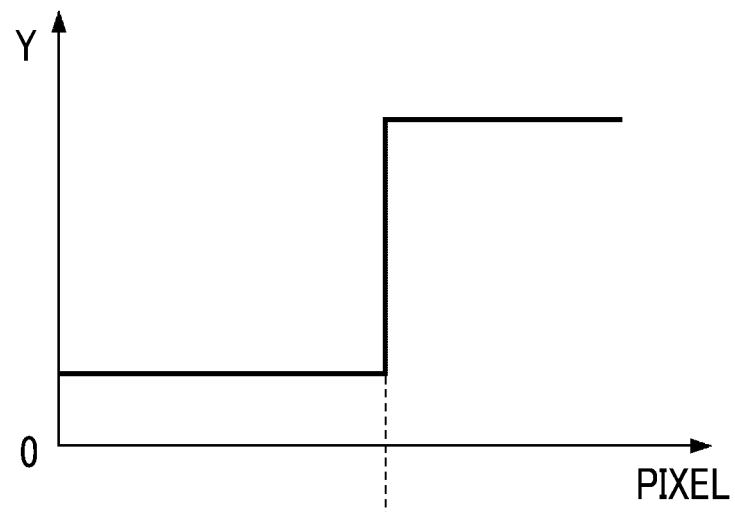
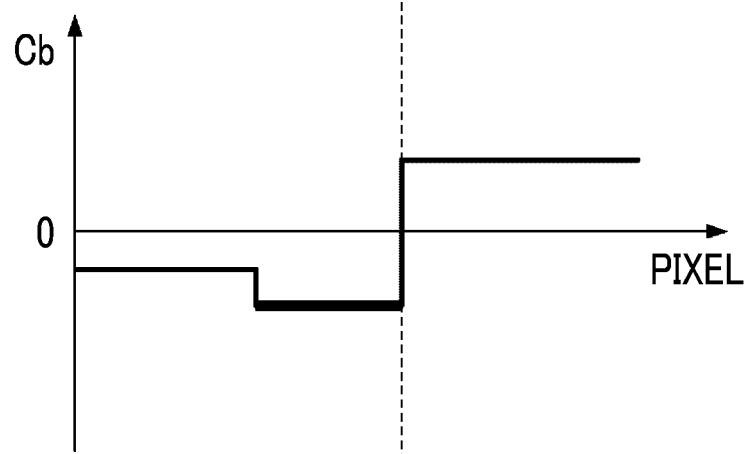
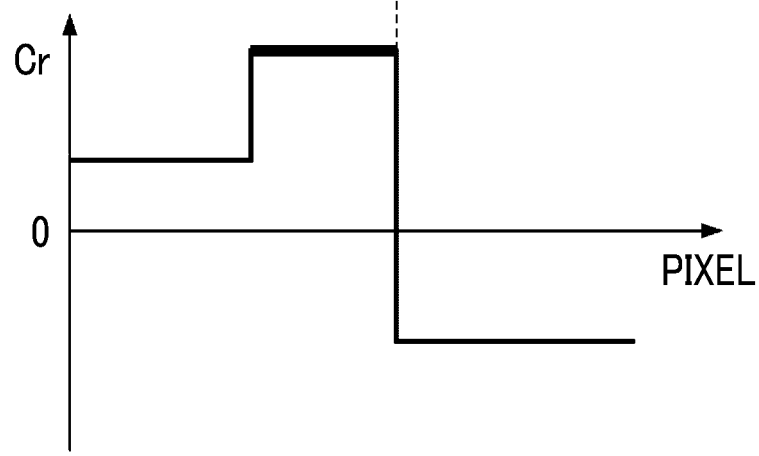

OUTPUTTING INFORMATION IN A CASE IN WHICH A FOCUS EVALUATION VALUE OF THE LATEST FRAME EXCEEDS AN ALLOWABLE VALUE SET BASED ON THE MAXIMUM EVALUATION VALUE DURING A MANUAL FOCUS PERIOD

CROSS-REFERENCE TO RELATED APPLICATIONS

The present application is a Continuation of PCT International Application No. PCT/JP2021/030190 filed on Aug. 18, 2021 claiming priority under 35 U.S.C § 119(a) to Japanese Patent Application No. 2020-141656 filed on Aug. 25, 2020. Each of the above applications is hereby expressly incorporated by reference, in its entirety, into the present application.

BACKGROUND OF THE INVENTION

1. Field of the Invention

The present invention relates to an image processing apparatus, an imaging apparatus, an image processing method, and an image processing program, in particular, relates to the technology of generating moving image data suitable for supporting manual focus.

2. Description of the Related Art

In recent years, a mirrorless camera, a single-lens reflex camera, or the like has been enhanced with a moving image function, and has come to be widely used for moving image content production. While these cameras are small, lightweight, and have high mobility during imaging, a monitor for confirming a live view image or a recorded image is also small, so that it is difficult to visually recognize whether or not a focus on a main subject is in focus as intended by a user.

A focus assist function has been developed to solve this problem, and some cameras are equipped with a "magnifying display function of a focus portion" or a "peaking function of coloring and displaying an outline portion of the subject in focus" (JP2019-105768A and JP2017-169188A).

SUMMARY OF THE INVENTION

One embodiment according to the technology of the present disclosure provides an image processing apparatus, an imaging apparatus, an image processing method, and an image processing program capable of recognizing a focus state of a main subject that a user wants to focus on during imaging of a moving image and capable of displaying a live view image suitable for the confirmation of the main subject and the confirmation of framing.

A first aspect of the present invention relates to an image processing apparatus comprising a processor, and a memory, in which the processor performs processing of generating first moving image data based on input imaging data, processing of setting a specific subject region including a specific subject in an imaging region represented by the imaging data or the first moving image data, processing of evaluating a focus state based on the imaging data or the first moving image data, processing of generating second moving image data in which a focus state of the specific subject region is visually recognizable based on data of the specific subject region, an evaluation result of the focus state, and the first moving image data, and processing of outputting the second moving image data to a display destination.

In the image processing apparatus according to a second aspect of the present invention, it is preferable that the second moving image data be moving image data in which the focus state of only the specific subject region is visually recognizable.

In the image processing apparatus according to a third aspect of the present invention, it is preferable that, in the processing of generating the second moving image data, the second moving image data be generated by performing processing of adding data based on the evaluation result of the focus state to the specific subject region represented by the data of the specific subject region in the imaging region represented by the first moving image data.

In the image processing apparatus according to a fourth aspect of the present invention, it is preferable that the processor generate third moving image data including an evaluation result of a focus state of the specific subject based on the imaging data or the first moving image data, and generate the second moving image data based on the specific subject region, the first moving image data, and the third moving image data.

In the image processing apparatus according to a fifth aspect of the present invention, it is preferable that the processor generate the second moving image data by combining the first moving image data excluding the specific subject region with the third moving image data of the specific subject region.

In the image processing apparatus according to a sixth aspect of the present invention, it is preferable that the processing of evaluating the focus state be processing of extracting an outline component of a subject based on the imaging data or the first moving image data and performing outline enhancement processing in accordance with an amplitude of the extracted outline component on the first moving image data.

In the image processing apparatus according to a seventh aspect of the present invention, it is preferable that the outline enhancement processing be processing of adding a specific color to a portion in which the amplitude of the extracted outline component exceeds a first threshold value and/or changing a density of the specific color in accordance with the amplitude of the outline component.

In the image processing apparatus according to an eighth aspect of the present invention, it is preferable that the processor set the specific subject region based on instruction input of the specific subject by a user.

In the image processing apparatus according to a ninth aspect of the present invention, it is preferable that the processor detect movement of the specific subject, and change the specific subject region in accordance with the movement of the specific subject.

It is preferable that the image processing apparatus according to a tenth aspect of the present invention further comprise a display unit or a first connection unit capable of being connected to an external display device, in which the display destination of the second moving image data is the display unit or the external display device connected to the first connection unit.

It is preferable that the image processing apparatus according to an eleventh aspect of the present invention further comprise a recording unit or a second connection unit capable of being connected to an external recording device, in which the processor outputs the first moving image data to the recording unit or the second connection unit.

In the image processing apparatus according to a twelfth aspect of the present invention, it is preferable that the processor alternately output the first moving image data and the second moving image data to the display destination for each first time.

In the image processing apparatus according to a thirteenth aspect of the present invention, it is preferable that the processor acquire a focus evaluation value indicating an evaluation result of a focus state of the specific subject, and output the first moving image data to the display destination in a case in which the acquired focus evaluation value exceeds a second threshold value.

In the image processing apparatus according to a fourteenth aspect of the present invention, it is preferable that the processor acquire a focus evaluation value indicating an evaluation result of a focus state of the specific subject, and output the first moving image data to the display destination in a case in which the acquired focus evaluation value does not have a decrease tendency and a state in which the focus evaluation value does not have the decrease tendency continues for a second time.

In the image processing apparatus according to a fifteenth aspect of the present invention, it is preferable that the processor acquire a focus evaluation value indicating an evaluation result of a focus state of the specific subject to acquire a maximum evaluation value which is a maximum value among the focus evaluation values for most recent plurality of frames, and output notification information indicating that the focus state of the specific subject in a latest frame is good to the display destination in a case in which a focus evaluation value of the latest frame exceeds an allowable value set based on the maximum evaluation value during a manual focus period.

A sixteenth aspect of the present invention relates to an imaging apparatus comprising an imaging unit that outputs the imaging data, and the image processing apparatus described above.

A seventeenth aspect of the present invention relates to an image processing method of generating moving image data for supporting manual focus by an image processing apparatus including a processor and a memory, the method comprising, as processing of the processor, a step of generating first moving image data based on input imaging data, a step of setting a specific subject region including a specific subject in an imaging region represented by the imaging data or the first moving image data, a step of evaluating a focus state based on the imaging data or the first moving image data, a step of generating second moving image data in which a focus state of the specific subject region is visually recognizable based on data of the specific subject region, an evaluation result of the focus state, and the first moving image data, and a step of outputting the second moving image data to a display destination.

It is preferable that the image processing method according to an eighteenth aspect of the present invention further comprise a step of generating third moving image data including an evaluation result of a focus state of the specific subject based on the imaging data or the first moving image data, in which, in the step of generating the second moving image data, the second moving image data is generated based on the specific subject region, the first moving image data, and the third moving image data.

In the image processing method according to a nineteenth aspect of the present invention, it is preferable that, in the step of generating the second moving image data, the second moving image data be generated by combining the first moving image data excluding the specific subject region with the third moving image data of the specific subject region.

A twentieth aspect of the present invention relates to an image processing program causing a computer to realize a function of generating first moving image data based on input imaging data, a function of setting a specific subject region including a specific subject in an imaging region represented by the imaging data or the first moving image data, a function of evaluating a focus state based on the imaging data or the first moving image data, a function of generating second moving image data in which a focus state of the specific subject region is visually recognizable based on data of the specific subject region, an evaluation result of the focus state, and the first moving image data, and a function of outputting the second moving image data to a display destination.

BRIEF DESCRIPTION OF THE DRAWINGS

FIG. 4 is a waveform diagram showing an example of first moving image data which has not been subjected to peaking processing.

FIG. 5 is a waveform diagram showing an example of the first moving image data (third moving image data) which has been subjected to the peaking processing.

DESCRIPTION OF THE PREFERRED EMBODIMENTS

In the following, preferred embodiments of an image processing apparatus, an imaging apparatus, an image processing method, and an image processing program according to the present invention will be described with reference to the accompanying drawings.

Configuration of Imaging Apparatus

Figure 1:
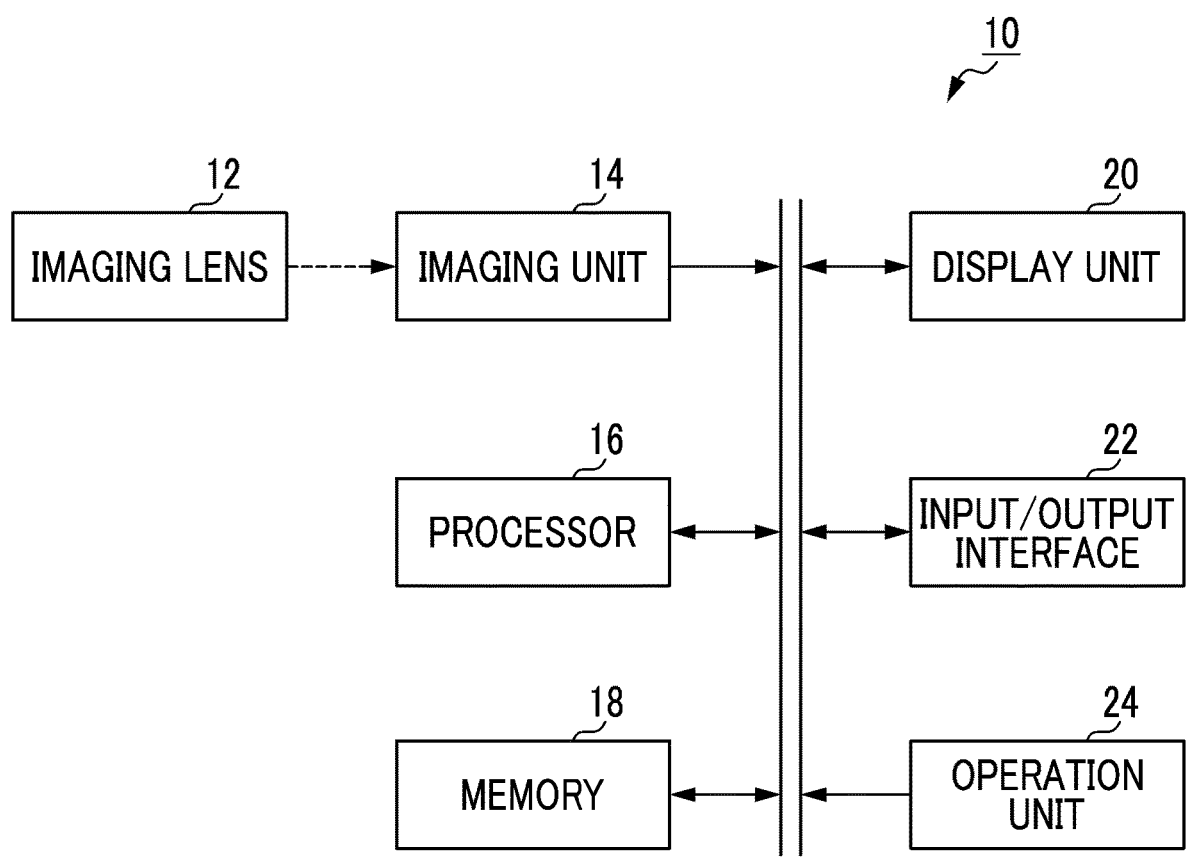
FIG. 1 is a diagram showing an embodiment of an internal configuration of an imaging apparatus according to the present invention.

FIG. 1 is a diagram showing an embodiment of an internal configuration of the imaging apparatus according to the present invention.

An imaging apparatus 10 is a camera that can capture a moving image, and comprises an imaging lens 12, an imaging unit 14, a processor 16, a memory 18, a display unit 20, an input/output interface 22, an operation unit 24, and the like.

The imaging lens 12 comprises a plurality of lens groups including a focus lens that forms a subject image, a stop that adjusts an amount of light, a focus ring that manually adjusts a position of the focus lens, and the like. In addition, the imaging lens 12 may be an interchangeable lens that can be attached to and detached from a camera body, or may be integrated with the camera body.

The imaging unit 14 comprises an imaging element that converts an optical image into an electric signal, an analog signal processing unit, an analog-to-digital (A/D) converter, and the like.

The imaging element is composed of, for example, a complementary metal-oxide semiconductor (CMOS) type color image sensor. It should be noted that the imaging element is not limited to the CMOS type, and may be a charge coupled device (CCD) type imaging element.

In the imaging element, on a plurality of pixels composed of photoelectric conversion elements (photodiodes) two-dimensionally arranged in an x direction (horizontal direction) and a y direction (vertical direction), a color filter of any one of three primary colors of red (R), green (G), or blue (B) is disposed in accordance with a predetermined color filter arrangement to constitute the pixel of each color of RGB. The color filter arrangement can be a general Bayer arrangement, but is not limited to this, and may be, for example, another color filter arrangement, such as an X-Trans (registered trademark) arrangement.

The optical image of the subject formed on a light-receiving surface of the imaging element of the imaging unit 14 by the imaging lens 12 is accumulated in each pixel of the imaging element as a charge corresponding to an amount of incidence ray. The electric signal corresponding to an amount of charge accumulated in each pixel is read out as an image signal from the imaging element and output to the analog signal processing unit.

The analog signal processing unit includes a sampling hold circuit, a color separation circuit, an automatic gain control (AGC) circuit, and the like. The AGC circuit functions as a sensitivity adjustment unit that adjusts the sensitivity during imaging (international organization for standardization (ISO) sensitivity), adjusts a gain of an amplifier that amplifies the input image signal, and includes a signal level of the image signal within an appropriate range. The A/D converter converts an analog image signal output from the analog signal processing unit into a digital image signal. It should be noted that, in a case in which the imaging element is the CMOS type image sensor, the analog signal processing unit and the A/D converter are often built in the CMOS type image sensor.

In a case in which the imaging of the moving image is performed, the imaging data (RAW data) is output from the imaging unit 14 at a set frame rate (30 fps, 60 fps, or the like).

The processor 16 includes a central processing unit (CPU), a dedicated electric circuit that performs specific signal processing on the imaging data, and the like, and functions as the image processing apparatus that generates various moving image data based on the imaging data input from the imaging unit 14. It should be noted that the details of the generation processing of various moving image data by the processor 16 will be described below.

The memory 18 includes a flash memory, a read-only memory (ROM), a random access memory (RAM), and the like. The flash memory and the ROM are non-volatile memories that store a camera control program, an image processing program according to the embodiment of the present invention, various data necessary for camera control, and the like. The RAM transitorily stores the imaging data and functions as a work area for processing by the processor 16. In addition, the camera control program, the image processing program, and the like stored in the flash memory or the like are transitorily stored. It should be noted that a part (RAM) of the memory 18 may be built in the processor 16.

The processor 16 controls each unit of the camera body and performs the image processing in accordance with the camera control program or the image processing program while using the RAM as the work area.

The display unit 20 is a display, such as a liquid crystal display (LCD) or an organic light emitting diode (OLED), and may comprise a touch panel on the display.

The display unit 20 is provided on a back surface of the camera body and displays a live view image during imaging. A user can confirm a focus state of the subject or confirm the framing by the live view image displayed on the display unit 20.

In addition, the display unit 20 functions as a notification unit that gives a notification (display) of various notification information to the user. Further, the display unit 20 displays a menu screen in a case in which various settings are performed, and is used as a user interface in a case in which an instruction of the user is received. It should be noted that the display unit 20 also includes a display unit 20 in a form of an electronic view finder (EVF).

The input/output interface 22 includes a first connection unit that can be connected to an external display device, a second connection unit that can be connected to an external recording device, a card connection unit to which a memory card is attached and detached, a communication unit that can be connected to a network, and the like. For example, as the input/output interface 22, a universal serial bus (USB), a high-definition multimedia interface (HDMI) (HDMI is a registered trademark), or the like can be applied. It should be noted that the USB and the HDMI can be commonly used as the first connection unit and the second connection unit, respectively.

In addition, the card connection unit and the memory card connected to the card connection unit correspond to a recording unit inside the camera with respect to the external recording device.

The operation unit 24 comprises various operation members for operating the imaging apparatus 10. The operation member includes various operation buttons, a touch panel, and the like, in addition to a power button and a record button.

The processor 16 functions as a control unit and the image processing apparatus of the imaging apparatus 10 by executing a predetermined program (camera control program, image processing program, or the like).

The control performed by the processor 16 includes the image processing, display control on the display unit 20, recording control on the recording unit, and the like in addition to the imaging control, such as automatic exposure (AE) and auto focus (AF).

In addition, the image processing performed by the processor 16 includes processing of generating the moving image data (first moving image data) for recording based on the imaging data (RAW data) input from the imaging unit 14, processing of generating the moving image data (second moving image data) for display (for live view), compression processing on the first moving image data for recording, and the like.

Image Processing Apparatus

Figure 2:
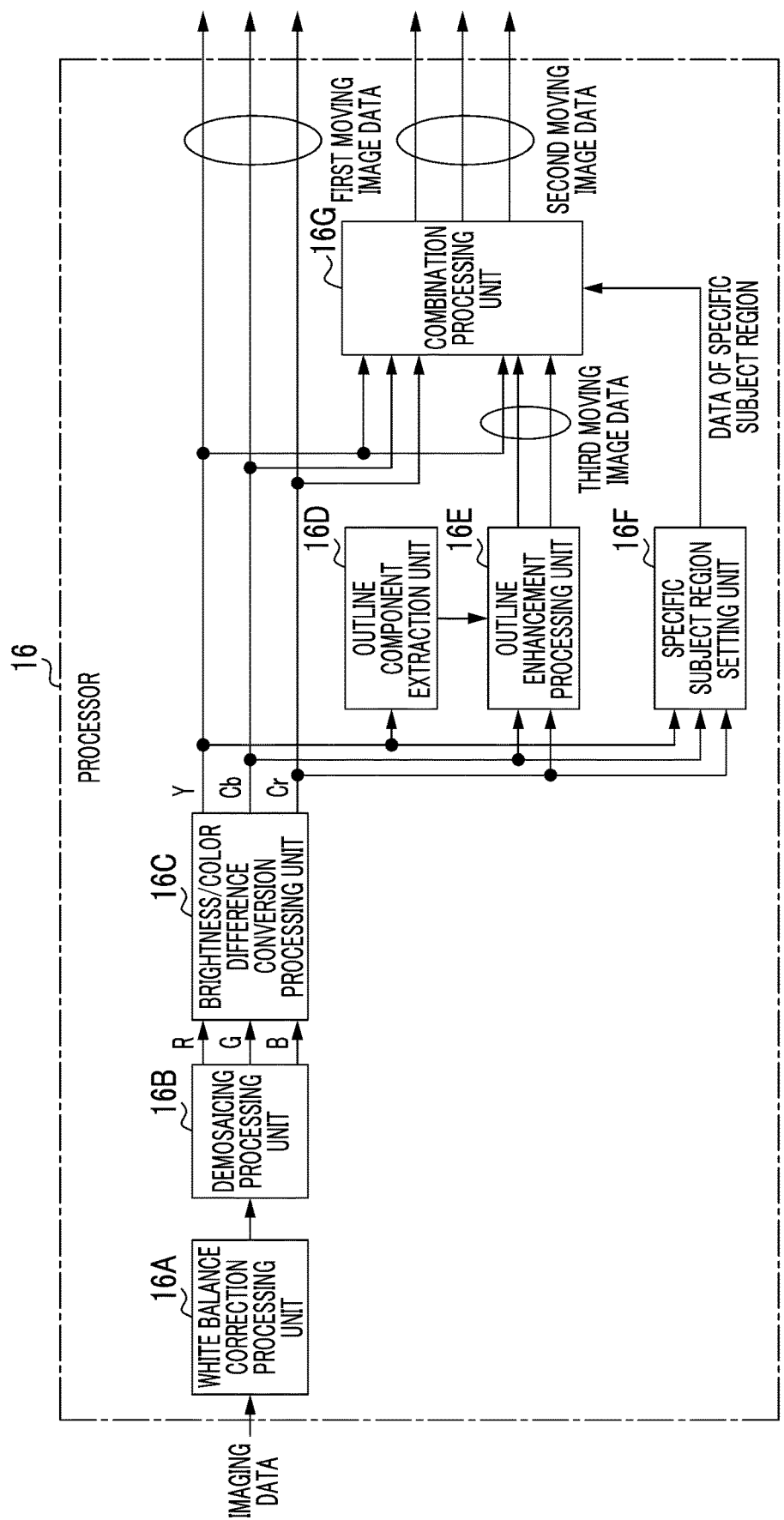
FIG. 2 is a block diagram showing an embodiment of the image processing apparatus according to the present invention.

FIG. 2 is a block diagram showing an embodiment of the image processing apparatus according to the present invention. The image processing apparatus according to the embodiment of the present invention comprises the processor 16 and the memory 18.

The processor 16 shown in FIG. 2 comprises a white balance correction processing unit 16A, a demosaicing processing unit 16B, a brightness/color difference conversion processing unit 16C, an outline component extraction unit 16D, an outline enhancement processing unit 16E, a specific subject region setting unit 16F, and a combination processing unit 16G.

The white balance correction processing unit 16A, the demosaicing processing unit 16B, the brightness/color difference conversion processing unit 16C, and the like are development treatment units that generate the first moving image data for recording from unprocessed imaging data (RAW data) to be input.

The white balance correction processing unit 16A calculates white balance (WB) gains Gr, Gg, and Gb for each color data of the input imaging data (R data, G data, and B data) and multiplies the R data, the G data, and the B data by the calculated WB gains Gr, Gg, and Gb, respectively, to perform the white balance correction on the imaging data. Here, as the method of calculating the WB gains Gr, Gg, and Gb, there is a method of specifying a type of a light source that illuminates the subject based on scene recognition (determination of outdoor or indoor) by the brightness (EV value) of the subject, the color temperature of the surrounding light, and the like and reading out the WB gain corresponding to the specified type of the light source from the memory 18 in which an appropriate WB gain is stored in advance for each type of the light source.

The demosaicing processing unit 16B is a processing unit that calculates color information of all RGB for each pixel by the interpolation processing from point-sequential mosaic image data consisting of RGB, and generates the image data of three RGB planes which have been subjected to the demosaicing processing (also referred to as demosaicking processing or simultaneous processing) from the mosaic image data.

The brightness/color difference conversion processing unit 16C performs processing of converting the RGB data which has been subjected to the demosaicing processing into brightness data (Y) and color difference data (Cb, Cr).

As described above, the first moving image data for recording which has been subjected to the image processing is generated from the unprocessed imaging data. It should be noted that, in the development treatment for the unprocessed imaging data, gamma-correction processing, outline enhancement processing for the brightness data (Y), color difference matrix processing for the color difference data (Cb, Cr), and the like are also performed, but these processing are known processing, and thus the detailed description thereof will be omitted.

The outline component extraction unit 16D inputs the brightness data (Y) of the first moving image data and extracts the outline component of the subject in a captured image. The outline component can be extracted by applying an outline extraction filter (for example, a Sobel filter) to the brightness data (Y).

Figure 3A:
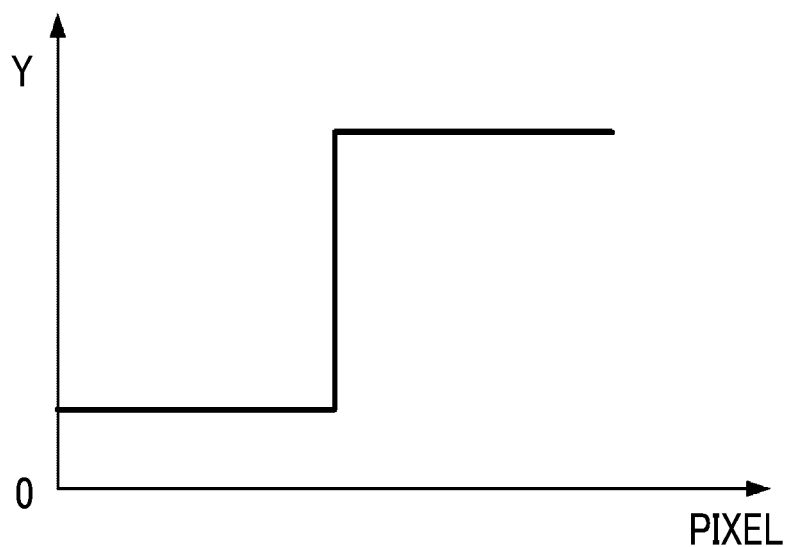
FIGS. 3A and 3B are waveform diagrams showing an outline component and the like extracted from brightness data.
Figure 3B:
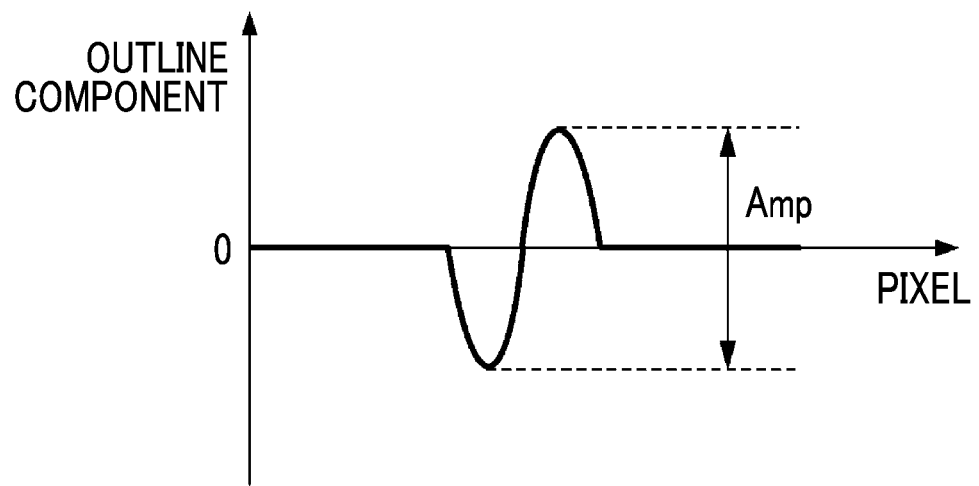

FIGS. 3A and 3B are waveform diagrams showing the outline component and the like extracted from the brightness data.

FIG. 3A is a waveform diagram of the brightness data (Y) of an outline portion. As shown in FIG. 3A, the brightness data (Y) is significantly changed in the outline portion.

FIG. 3B is a waveform diagram showing the outline component extracted from the brightness data (Y) of FIG. 3A. As shown in FIG. 3B, the outline component extraction unit 16D extracts a portion (outline portion) in which the brightness data (Y) is changed, and outputs the outline component having the amplitude [Amp] in accordance with the magnitude of the change. The amplitude [Amp] corresponds to a focus evaluation value indicating an evaluation result of the focus state of the subject, and a larger amplitude [Amp] (focus evaluation value) indicates that the focus state is better.

The outline enhancement processing unit 16E is a portion that inputs the color difference data (Cb, Cr) of the first moving image data and the outline component of the subject extracted by the outline component extraction unit 16D and performs the outline enhancement processing in accordance with the amplitude [Amp] of the outline component on the first moving image data (in the present example, the color difference data (Cb, Cr)).

The outline enhancement processing unit 16E of the present example is a portion that performs, on the first moving image data, processing (peaking processing) of adding a specific color (for example, red) to the outline portion of the subject, and a specific color is added to the portion in which the amplitude [Amp] of the outline component extracted by the outline component extraction unit 16D exceeds a first threshold value.

Here, it is preferable to set the first threshold value to the minimum amplitude among the amplitudes of the outline component of the subject, which is obtained in a case in which the focus state of the subject is appropriate. Therefore, in the subject of which the focus state is appropriate, the amplitude of the outline component exceeds the first threshold old value.

It should be noted that, since the amplitude [Amp] of the outline component to be extracted differs depending on the type of the outline extraction filter, it is preferable to set the first threshold value in consideration of the type of the outline extraction filter. In addition, since the amplitude of the outline component of the subject varies depending on the intensity of the ambient light, it is preferable to appropriately set the first threshold value in accordance with the brightness of the subject.

In addition, the outline enhancement processing unit 16E may perform the peaking processing of changing the density of the specific color in accordance with the amplitude [Amp] of the outline component extracted by the outline component extraction unit 16D, or may perform the peaking processing of further changing the density of the specific color in accordance with the amplitude of the outline component on the portion in which the amplitude [Amp] of the outline component exceeds the first threshold value.

The specific color is added to the outline portion (that is, a portion having high contrast) of the subject, the first moving image data (third moving image data) which has been subjected to the peaking processing is the data including the evaluation result of the focus state of the imaging region, and the peaking processing is processing of evaluating the focus state.

FIG. 4 is a waveform diagram showing an example of the first moving image data which has not been subjected to the peaking processing, and FIG. 5 is a waveform diagram showing an example of the first moving image data (third moving image data) which has been subjected to the peaking processing.

In a case in which the first moving image data which has not been subjected to the peaking processing includes the brightness data (Y) and the color difference data (Cb, Cr) shown in FIG. 4, in the first moving image data (third moving image data) which has been subjected to the peaking processing shown in FIG. 5, a value of the color difference data (Cb, Cr) is replaced such that the pixel (outline portion) in which the brightness data (Y) is switched is red.

The specific subject region setting unit 16F performs processing of setting a specific subject region including a specific subject in the imaging region represented by the imaging data or the first moving image data.

Here, the specific subject of the present example means a subject that is a part of the main subject in the imaging region.

Figure 6:
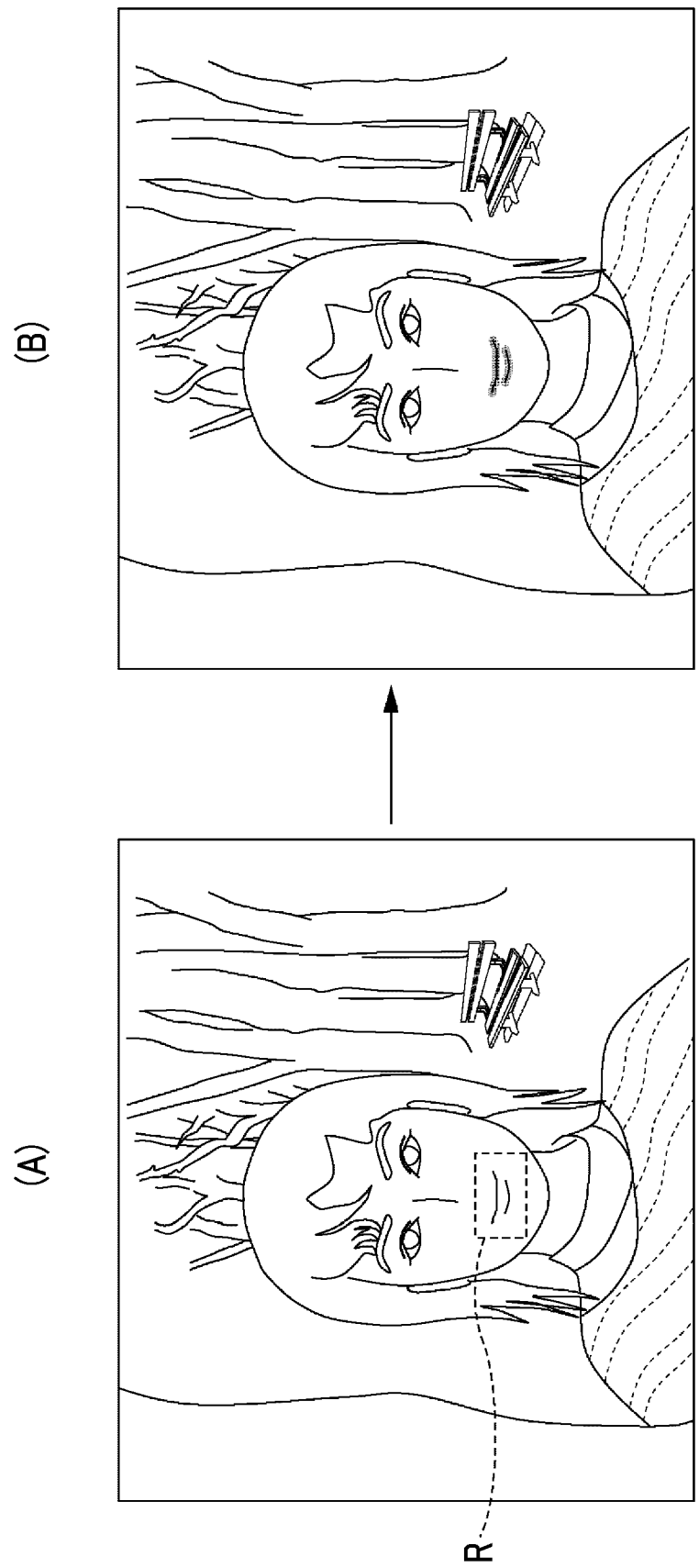
FIG. 6 is a diagram showing an example of a specific subject and a peaking range.

FIG. 6 is a diagram showing an example of the specific subject and a peaking range.

As shown in a portion (A) of FIG. 6, in a case of the moving image in which a face of a person is largely reflected in the imaging region, the face of the person is the main subject, and a face part of the person (in the present example, the "mouth") is the specific subject. A specific subject region R shown in the portion (A) of FIG. 6 is a rectangular region including a "mouth".

In addition, the specific subject region R is a peaking range in which the peaking processing is performed, and is a region including the specific subject. In the moving image shown in a portion (B) of FIG. 6, the peaking processing is performed only on the "mouth".

It should be noted that, in a case in which the face of the person is the main subject, the specific subject is not limited to the "mouth", but may be the "eyes" (including only one eye), the "nose", or the "hair". In addition, in a case of a scene in which a flower is imaged in close-up, the "pistil" or the "stamen" can be set as a specific subject.

In addition, in a case in which the person in the imaging region is small, the entire face of the person can be set as the specific subject, and in a case in which a plurality of flowers are present in the imaging region, one of the plurality of flowers can be used as the specific subject.

The specific subject is a part of the main subject, and it is preferable that the main subject also be in focus in a case in which the specific subject is in focus. In a case in which the region of the main subject is sufficiently small with respect to the imaging region, the main subject may be set as the specific subject.

The specific subject region setting unit 16F can set the specific subject region based on instruction input of the specific subject by the user. In this case, the user can designate the specific subject by using the touch panel or the like while viewing the live view image displayed on the display unit 20.

In addition, the specific subject region setting unit 16F can automatically set a central region of the imaging region at the start of the imaging of the moving image as the specific subject region. In this case, it is preferable that the user perform the framing such that the specific subject is included in the central region of the imaging region at the start of the imaging of the moving image.

Further, it is preferable that the specific subject region setting unit 16F detect the movement of the specific subject and change the specific subject region (position, size) in accordance with the movement of the specific subject. The movement of the specific subject can be detected by tracking a feature point of the specific subject in each frame constituting the first moving image data.

The combination processing unit 16G inputs the first moving image data, the third moving image data, and the data of the specific subject region set by the specific subject region setting unit 16F, and generates moving image data (second moving image data) in which the focus state of the specific subject region is visually recognizable based on these data.

The combination processing unit 16G generates the second moving image data by combining the first moving image data excluding the specific subject region with the third moving image data of the specific subject region. The combination processing unit 16G can generate the second moving image data by erasing a portion of the first moving image data corresponding to the specific subject region and combining the third moving image data of the specific subject region with the portion in a fitted manner.

It should be noted that the generation of the second moving image data is not limited to the case in which the second moving image data is generated by combining the first moving image data excluding the specific subject region with the third moving image data of the specific subject region, and the second moving image data may be generated by performing the peaking processing only on the specific subject region of the first moving image data based on the data of the specific subject region, the evaluation result of the focus state, and the first moving image data. In this case, it is not necessary to generate the third moving image data in which the peaking processing is performed on the entire screen.

In addition, the present invention is not limited to the case in which the second moving image data is generated by performing the peaking processing of adding the specific color to the outline portion of the specific subject based on the evaluation result of the focus state of the specific subject region, and the second moving image data may be generated by performing edge enhancement processing of enhancing the outline portion of the specific subject, in short, processing of generating the second moving image data by performing processing of adding the data based on the evaluation result of the focus state need only be performed.

The portion (B) of FIG. 6 shows an example of the live view image corresponding to the second moving image data in which the peaking processing is performed only on the specific subject region R.

The second moving image data is moving image data in which the peaking processing is performed only on the specific subject region R in the first moving image data, and the peaking processing is performed only on the specific subject region R including the "mouth" which is the specific subject as shown in the portion (B) of FIG. 6.

In a case in which the user focuses the imaging lens 12 on the main subject (specific subject) by operating the focus ring, the user operates the focus ring while viewing the live view image displayed on the display unit 20 (while confirming the focus state of the specific subject).

That is, the user operates the focus ring such that the specific color for enhancing the outline portion of the specific subject in the specific subject region R appears or the density of the specific color is maximized while viewing the live view image in which the peaking processing is performed only on the specific subject region R, so that the manual focus can be satisfactorily performed even in a case in which a screen size of the display unit 20 is small.

In addition, since the peaking processing is performed only on a portion (specific subject region R) that the user wants to focus on instead of the entire imaging region, it is possible to confirm the focus state of the specific subject region R while viewing the live view image even during the imaging of the moving image. In addition, since the peaking processing is not performed on the entire imaging region, for example, the confirmation of the main subject, such as a facial expression of the person, and the confirmation of the framing can be appropriately performed.

Figure 7:
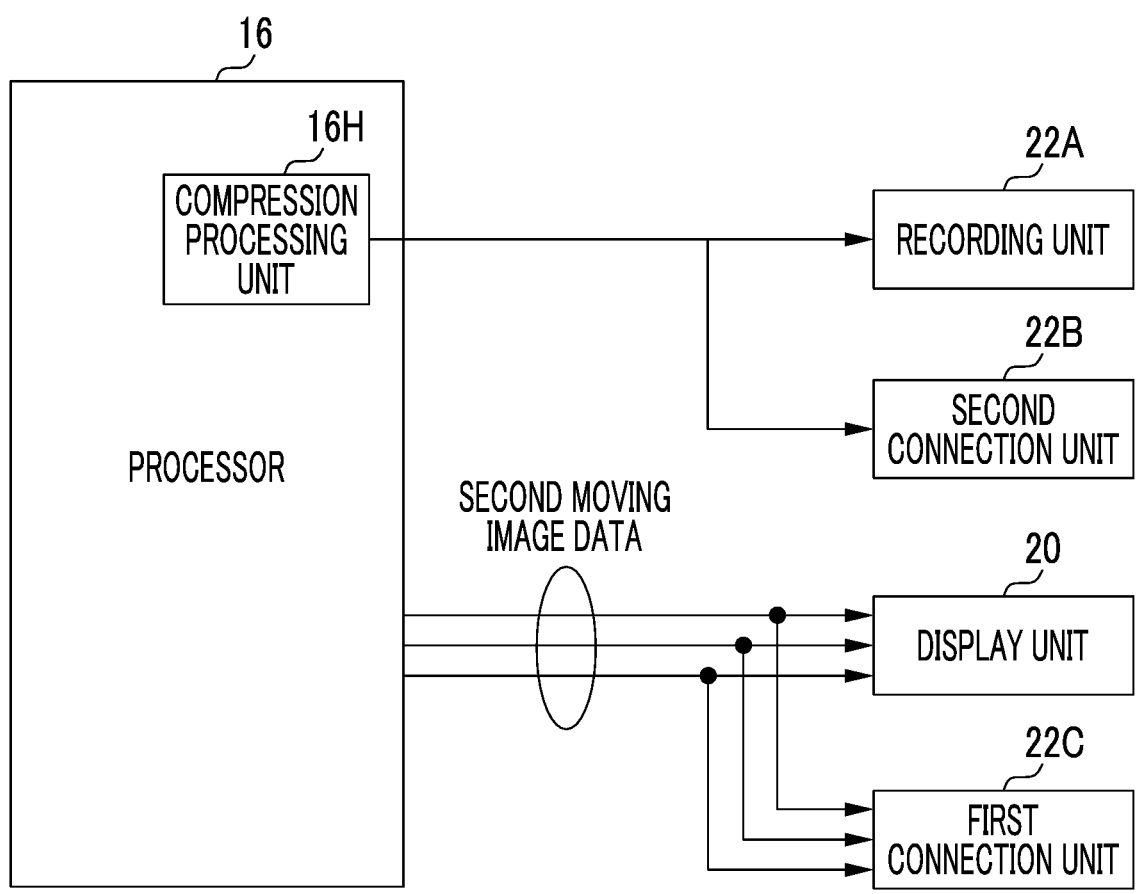
FIG. 7 is a diagram showing a recording destination of the first moving image data and a display destination of second moving image data.

FIG. 7 is a diagram showing a recording destination of the first moving image data and a display destination of the second moving image data.

The processor 16 can output the first moving image data which has not been subjected to the peaking processing to a recording unit 22A or an external recording device connected to a second connection unit 22B as the recording destination.

The recording unit 22A includes, for example, the memory card mounted in the card connection unit of the input/output interface 22, and records the first moving image data input from the processor 16 in the memory card.

The second connection unit 22B is, for example, the USB, the HDMI, or the like of the input/output interface 22. In a case in which the external recording device is connected to the second connection unit 22B, the external recording device can record the first moving image data input from the processor 16.

It is preferable that the processor 16 comprise a compression processing unit 16H and output the first moving image data compressed by the compression processing unit 16H to the recording unit 22A or the second connection unit 22B.

The compression processing in the compression processing unit 16H is processing of generating a moving image file in a predetermined compression format. A well-known codec can be adopted as the codec in a case of compression. For example, a codec standardized by moving picture experts group (MPEG) (MPEG-1, MPEG-2, MPEG-4, or the like), H. 264, or the like can be adopted.

In addition, in a case in which the external recording device connected to the second connection unit 22B has a large storage capacity, the processor 16 can output uncompressed first moving image data to the second connection unit 22B.

The processor 16 outputs the first moving image data (second moving image data) which has been subjected to the peaking processing to the display unit 20 or an external display device connected to a first connection unit 22C as the display destination.

The display unit 20 can display the live view image based on the second moving image data input from the processor 16 during standby and during the imaging of the moving image.

The first connection unit 22C is, for example, the USB, the HDMI, or the like of the input/output interface 22. In a case in which the external display device is connected to the first connection unit 22C, the external display device can display the live view image based on the second moving image data input from the processor 16.

It should be noted that the first moving image data and the second moving image data of the present example are the brightness data (Y) and the color difference data (Cb, Cr), but the moving image data may be used in which the brightness data (Y) and the color difference data (Cb, Cr) are converted into the RGB data.

Image Processing Method

The image processing method according to the embodiment of the present invention is a method of generating the moving image data for supporting the manual focus, and the processor 16 shown in FIG. 2 generates the moving image data as a main body of each processing.

First Embodiment

Figure 8:
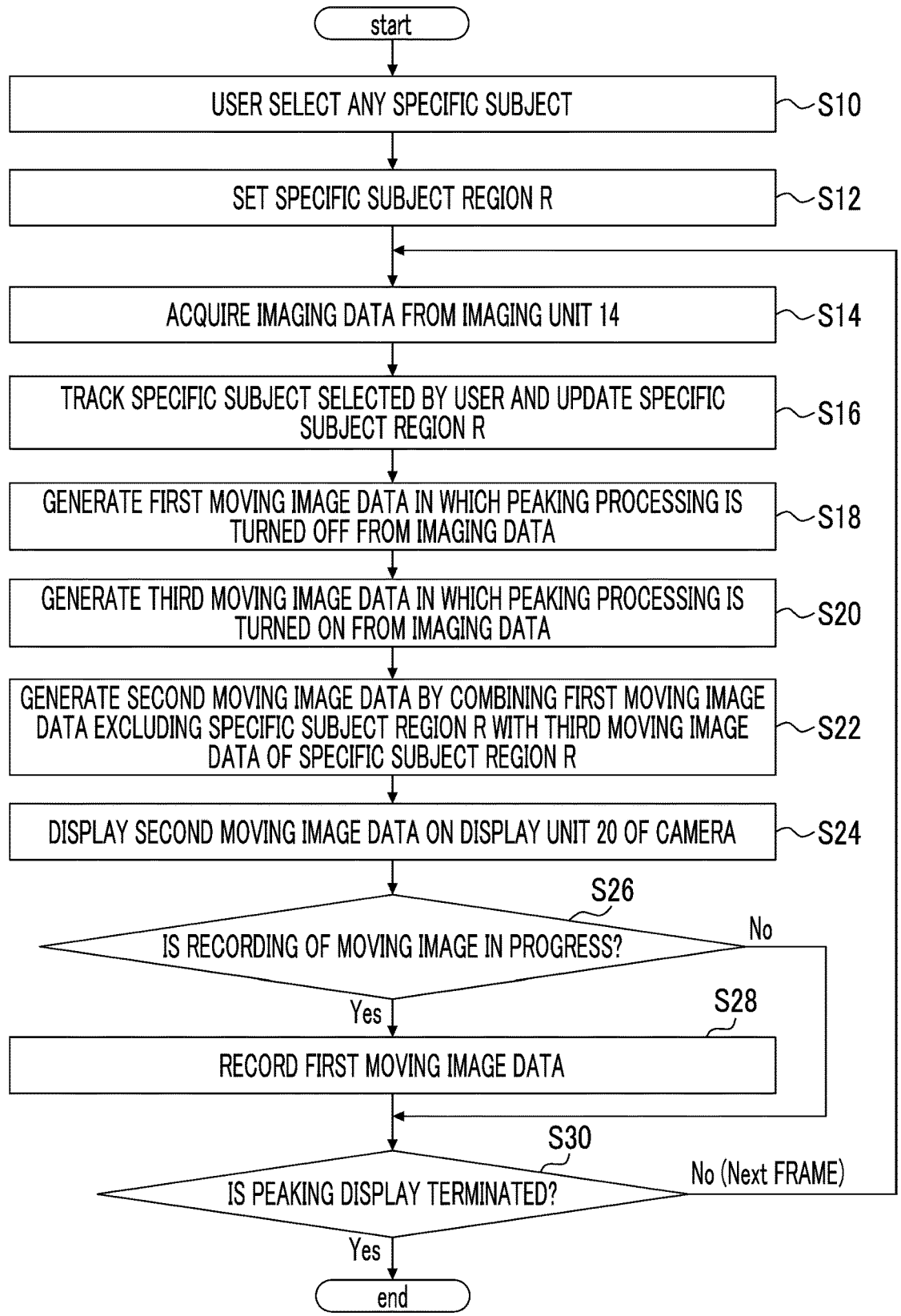
FIG. 8 is a flowchart showing a first embodiment of an image processing method according to the present invention.

FIG. 8 is a flowchart showing a first embodiment of the image processing method according to the present invention.

In FIG. 8, in a case in which the imaging of the moving image is started, the user selects any specific subject (step S10). The selection is to confirm the focus state with respect to the main subject including the specific subject. In addition, any specific subject can be selected by using the user interface, such as the display unit 20 that displays the live view image and the touch panel.

In a case in which the instruction input of the specific subject by the user is received, the specific subject region setting unit 16F of the processor 16 sets the specific subject region R in the imaging region (step S12). The specific subject region R is the peaking range in which the peaking processing is performed.

The processor 16 acquires the imaging data from the imaging unit 14 (step S14).

The specific subject region setting unit 16F tracks the specific subject selected by the user based on the imaging data and updates the specific subject region R (step S16). The tracking and update are to confirm the focus state of the main subject that the user wants to confirm even in a case in which the specific subject moves. It should be noted that the tracking of the specific subject may be performed based on the first moving image data generated from the imaging data.

The processor 16 performs development treatment on the imaging data (RAW data) acquired in step S14 to generate the first moving image data for recording (first moving image data in which peaking is OFF) (step S18).

Subsequently, the processor 16 (outline component extraction unit 16D, outline enhancement processing unit 16E) generates the third moving image data (first moving image data in which peaking is ON) which has been subjected to the peaking processing based on the imaging data or the first moving image data (step S20). The third moving image data is the moving image data obtained by performing the peaking processing on the first moving image data with the entire range of the imaging region as the peaking range.

The combination processing unit 16G generates second moving image data for display in which the focus state of the specific subject region is visually recognizable based on the first moving image data, the third moving image data, and the data of the specific subject region set by the specific subject region setting unit 16F (step S22). That is, the combination processing unit 16G generates the second moving image data by generating the first moving image data excluding the specific subject region based on the first moving image data and the data of the specific subject region, generating the third moving image data of the specific subject region based on the third moving image data and the data of the specific subject region, and combining the first moving image data excluding the specific subject region with the third moving image data of the specific subject region.

The processor 16 outputs the second moving image data for display to the display unit 20 of camera of the display destination, and displays an image (live view image) in which the focus state of the specific subject region is visually recognizable (step S24).

In addition, the processor 16 determines whether or not the recording of the moving image is in progress (step S26), and records the first moving image data for recording generated in step S18 in the recording unit 22A in a case in which recording of the moving image is in progress (in a case of "Yes") (step S28).

In a case in which the recording of the moving image is not in progress (in a case of "No"), the transition is made to step S30 without going through step S28. For example, displaying the live view image before the start of the imaging of the moving image corresponds to a case in which the recording of the moving image is not in progress.

Subsequently, the processor 16 determines whether or not to terminate peaking display (step S30), transitions to step S14 in a case in which it is determined not to terminate the peaking display (in a case of "No"), and repeats the processing from step S14 to step S30 with respect to the imaging data of the next frame. The determination as to whether or not to terminate the peaking display can be made, for example, based on the presence or absence of the instruction input for the user to change the peaking setting to off.

In a case in which it is determined to terminate the peaking display (in a case of "Yes"), the processor 16 terminates the present processing.

According to the first embodiment of the image processing method, the peaking processing is performed on only a part (specific subject region R) of the main subject that the user wants to focus on, instead of the entire imaging region, the confirmation of the main subject, such as the facial expression of the person, and the confirmation of the framing can be appropriately performed.

In addition, as a modification example of the first embodiment, in a case in which the focus evaluation value (amplitude [Amp]) of the specific subject in the specific subject region R exceeds a threshold value (second threshold value) that is regarded as focusing, the processor 16 may output the first moving image data to the display destination (display unit 20 or first connection unit 22C) instead of the second moving image data.

Accordingly, in a case in which the focus lens is focused on the main subject, the user can view the live view image without peaking and can more easily confirm the main subject.

Second Embodiment

Figure 9:
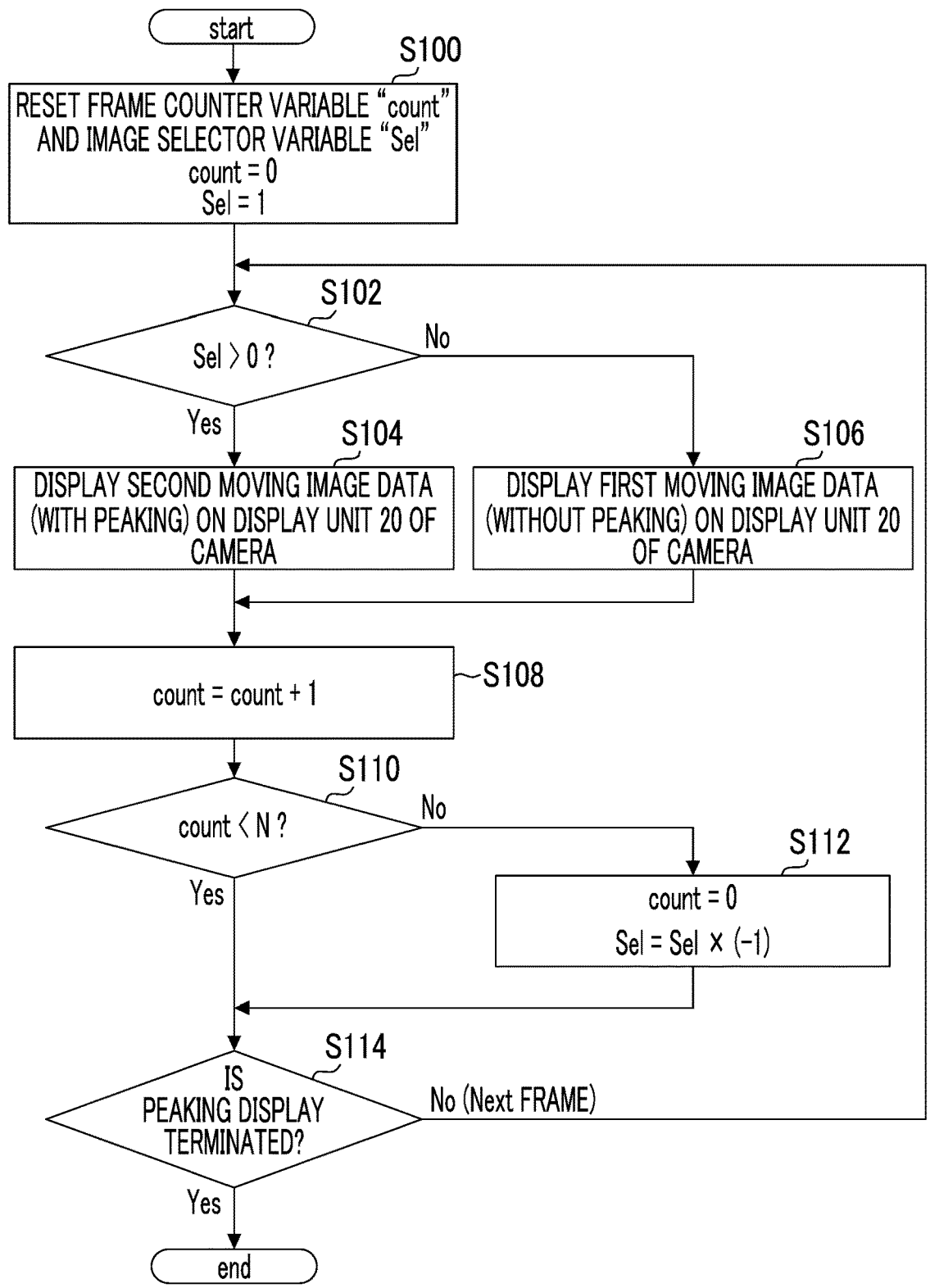
FIG. 9 is a flowchart showing a second embodiment of the image processing method according to the present invention.

FIG. 9 is a flowchart showing a second embodiment of the image processing method according to the present invention.

Since the display method of the peaking display is different between the second embodiment of the image processing method and the first embodiment shown in FIG. 8, the description of the generation method of the first moving image data and the second moving image data will be omitted.

In the second embodiment of the image processing method, the first moving image data (without peaking) and the second moving image data (with peaking) are alternately output to the display destination for each first time.

In FIG. 9, a frame counter variable "count" is reset to "0" and an image selector variable "sel" is set to "1" (step S100).

Subsequently, the processor 16 determines whether or not the image selector variable "sel" is greater than "0" (sel>0) (step S102). In a case in which sel>0 is satisfied (in a case of "Yes"), the processing proceeds to step S104, where the live view image "with peaking" is displayed on the display unit 20 based on the second moving image data.

On the other hand, in a case in which sel>0 is not satisfied (in a case of "No"), the processing proceeds to step S106, where the live view image "without peaking" is displayed on the display unit 20 based on the first moving image data. It should be noted that, at the start of the imaging, since the image selector variable "sel" is set to "1", the live view image "with peaking" is displayed on the display unit 20.

Next, the processor 16 increments the frame counter variable "count" by 1 (step S108), and determines whether or not the frame counter variable "count" is smaller than N (count<N) (step S110).

Now, in a case in which the frame rate is 30 fps and the live view image "with peaking" and the live view image "without peaking" are alternately displayed for each 1 to 2 seconds, it is preferable to set N to a value within a range of 30 to 60.

In step S110, in a case in which it is determined that count<N is satisfied (in a case of "Yes"), the transition is made to step S114. In step S110, in a case in which it is determined that count<N is not satisfied (in a case of "No"), the transition is made to step S112. It should be noted that, in order to satisfy count<N from the start of the imaging to the imaging of N frames, the transition to step S114 is made.

Next, the processor 16 determines whether or not to terminate peaking display (step S114), transitions to step S102 in a case in which it is determined not to terminate the peaking display (in a case of "No"), and repeats the processing from step S102 to step S114 with respect to the imaging data of the next frame.

On the other hand, in a case in which the display of the live view image "with peaking" continues for the first time (N frames), in step S110, it is determined that count<N is not satisfied (in a case of "No"), and the transition to step S112 is made. In step S112, the frame counter variable "count" is reset to "0" and sel=sel×(−1), and a sign of the image selector variable "sel" is inverted. It should be noted that, at the start of the imaging, since the image selector variable "sel" is set to "1", the sign of the image selector variable "sel" after the first time (after N frames) from the start of the imaging is inverted to "−1".

In a case in which the image selector variable "sel" is "−1", in step S102, it is determined that sel>0 is not satisfied, and the processing proceeds to step S106, where the live view image "without peaking" is displayed on the display unit 20 based on the first moving image data.

As described above, the processor 16 displays the live view image "with peaking" based on the second moving image data and the live view image "without peaking" based on the first moving image data on the display unit 20 in a switched manner for each first time (N frame).

According to the second embodiment of the image processing method, since the peaking display disappears for each first time, the main subject can be more easily confirmed.

Third Embodiment

Figure 10:
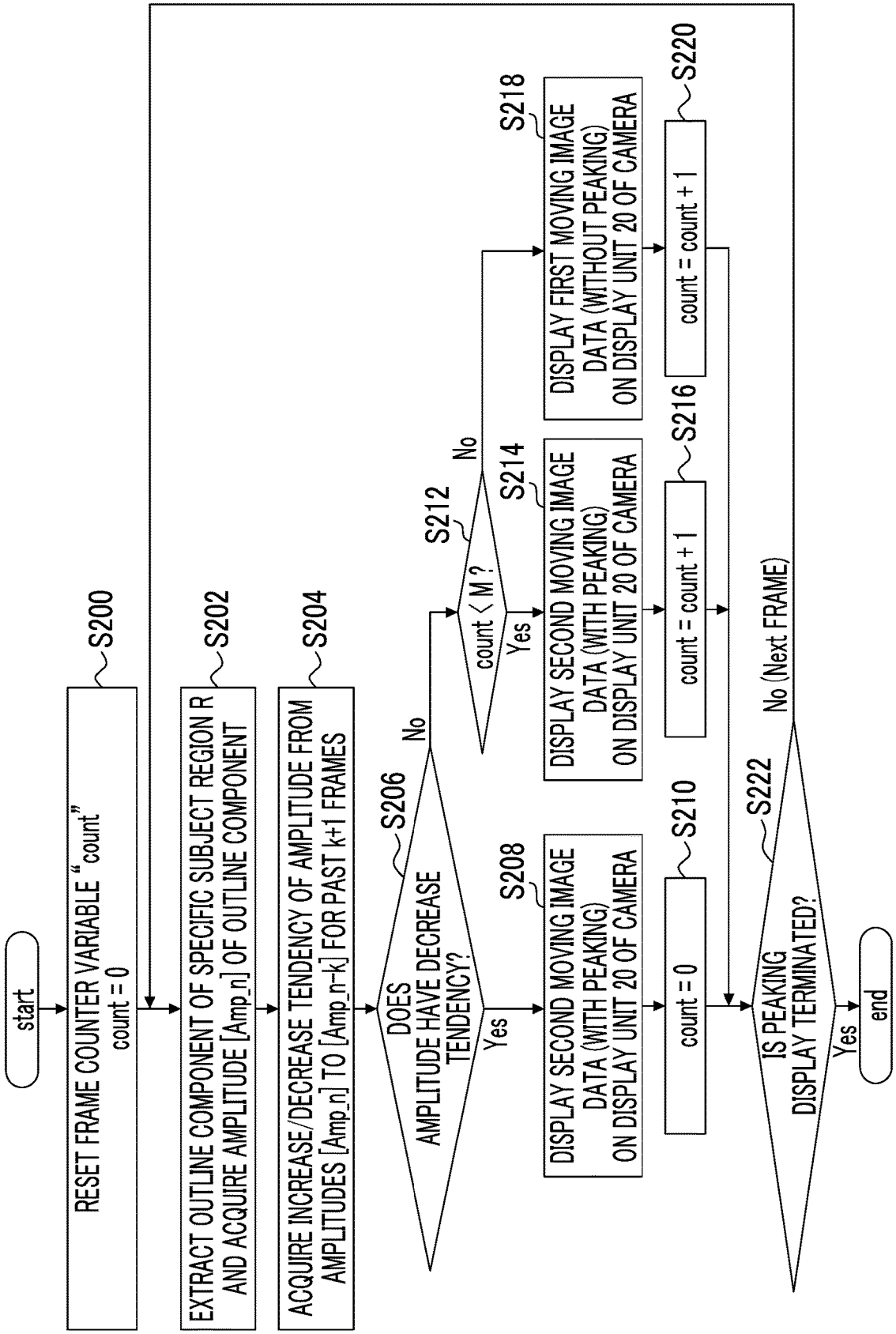
FIG. 10 is a flowchart showing a third embodiment of the image processing method according to the present invention.

FIG. 10 is a flowchart showing a third embodiment of the image processing method according to the present invention.

Since the display method of the peaking display is different between the third embodiment of the image processing method and the first embodiment shown in FIG. 8, the description of the generation method of the first moving image data and the second moving image data will be omitted.

In the third embodiment of the image processing method, the live view image "without peaking" is displayed in a case in which the manual focus is not necessary, and the live view image "with peaking" is displayed in a case in which the manual focus is necessary.

In FIG. 10, the frame counter variable "count" is reset to "0" (step S200).

Subsequently, the outline component extraction unit 16D of the processor 16 extracts the outline component of the specific subject from the brightness data (Y) of the specific subject region R, and acquires the amplitude [Amp_n] of the outline component (step S202).

The amplitude [Amp_n] indicates the amplitude [Amp] of the current frame n (FIG. 3B). In addition, it is desirable to adopt, as the amplitude [Amp_n], a value obtained by averaging the amplitudes of pixels in which the amplitude of the outline component of the specific subject is equal to or greater than a threshold value th.

The processor 16 acquires an increase/decrease tendency of the amplitude [Amp] from the amplitudes [Amp_n] to [Amp_n−k] for the past (k+1) frames (step S204). Regarding the increase/decrease tendency of the amplitude, for example, a difference ΔAmp_n from the amplitude of the immediately preceding frame is calculated for each frame, and the decrease tendency can be obtained in a case in which an average value of ΔAmp_n to ΔAmp_n−k for k+1 frames is smaller than 0 and the increase tendency can be obtained in a case in which the average value of ΔAmp_n to ΔAmp_n−k for k+1 frames is equal to or greater than 0.

Subsequently, the processor 16 determines whether or not the increase/decrease tendency of the amplitude [Amp] is the decrease tendency (step S206).

Figure 11:
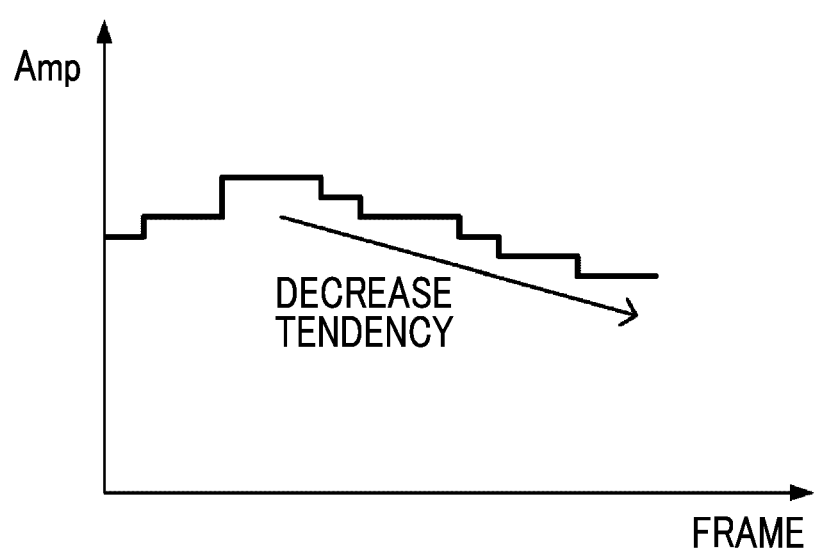
FIG. 11 is a diagram showing an example of a transition of an amplitude [Amp] of the outline component.

FIG. 11 is a diagram showing an example of a transition of the amplitude [Amp] of the outline component. The example shown in FIG. 11 shows a case in which the increase/decrease tendency of the amplitude [Amp] is the decrease tendency.

In step S206, in a case in which it is determined that the increase/decrease tendency of the amplitude [Amp] is the decrease tendency (in a case of "Yes"), the processor 16 outputs the second moving image data to the display unit 20 to display the live view image "with peaking" on the display unit 20 (step S208).

Subsequently, the frame counter variable "count" is reset to "0" (step S210), and the transition to step S222 is made.

In step S222, it is determined whether or not to terminate the peaking display. In a case in which it is determined not to terminate the peaking display (in a case of "No"), the processing transitions to step S202, and the processing of step S202 to step S222 is repeated for the imaging data of the next frame.

On the other hand, in step S206, in a case in which it is determined that the increase/decrease tendency of the amplitude [Amp] is not the decrease tendency (in a case of "No"), the processing transitions to step S212, whether or not the frame counter variable "count" is smaller than M (count<M) is determined.

Here, it is determined whether or not a state in which the amplitude [Amp] corresponding to the focus evaluation value does not have the decrease tendency continues for M frames (continues for a second time). The second time is preferably about 3 to 5 seconds, and it is preferable to set M to a value within a range of 90 to 150 in a case in which the frame rate is 30 fps.

In step S212, in a case in which count<M is determined (in a case of "Yes"), the transition to step S214 is made. In step S214, the display unit 20 displays the live view image "with peaking" based on the second moving image data (step S208).

Subsequently, the frame counter variable "count" is incremented by 1 (step S216), and the transition to step S222 is made.

On the other hand, in step S212, in a case in which it is determined that count<M is not satisfied (in a case of "No"), that is, in a case in which the amplitude [Amp] does not have the decrease tendency and a state in which the amplitude does not have the decrease tendency continues for M frames or more, the processor 16 outputs the first moving image data to the display unit 20, displays the live view image "without peaking" on the display unit 20 (step S218), and increments the frame counter variable "count" by 1 (step S220).

As described above, in a case in which the amplitude [Amp] does not have the decrease tendency and the state in which the amplitude does not have the decrease tendency continues for M frames or more (second time or more), the processor 16 determines that the focus state is stable and the manual focus is not necessary and turns off the peaking display, so that the user can more easily confirm the main subject.

On the other hand, in a case in which the increase/decrease tendency of the amplitude [Amp] is changed to the decrease tendency (in a case in which the focus state is deteriorated), the processor 16 transitions from step S206 to step S208 and restarts the peaking display, so that the user can easily grasp that the focus state is deteriorated.

It should be noted that, although not shown in FIG. 10, it is desirable to restart the peaking display in a case in which the user operates the focus ring and a focus position of the focus lens moves.

According to the third embodiment of the image processing method, in a case in which the focus state is stable and the manual focus is not necessary, the peaking display is turned off, so that the user can more easily confirm the main subject.

Fourth Embodiment

Figure 12:
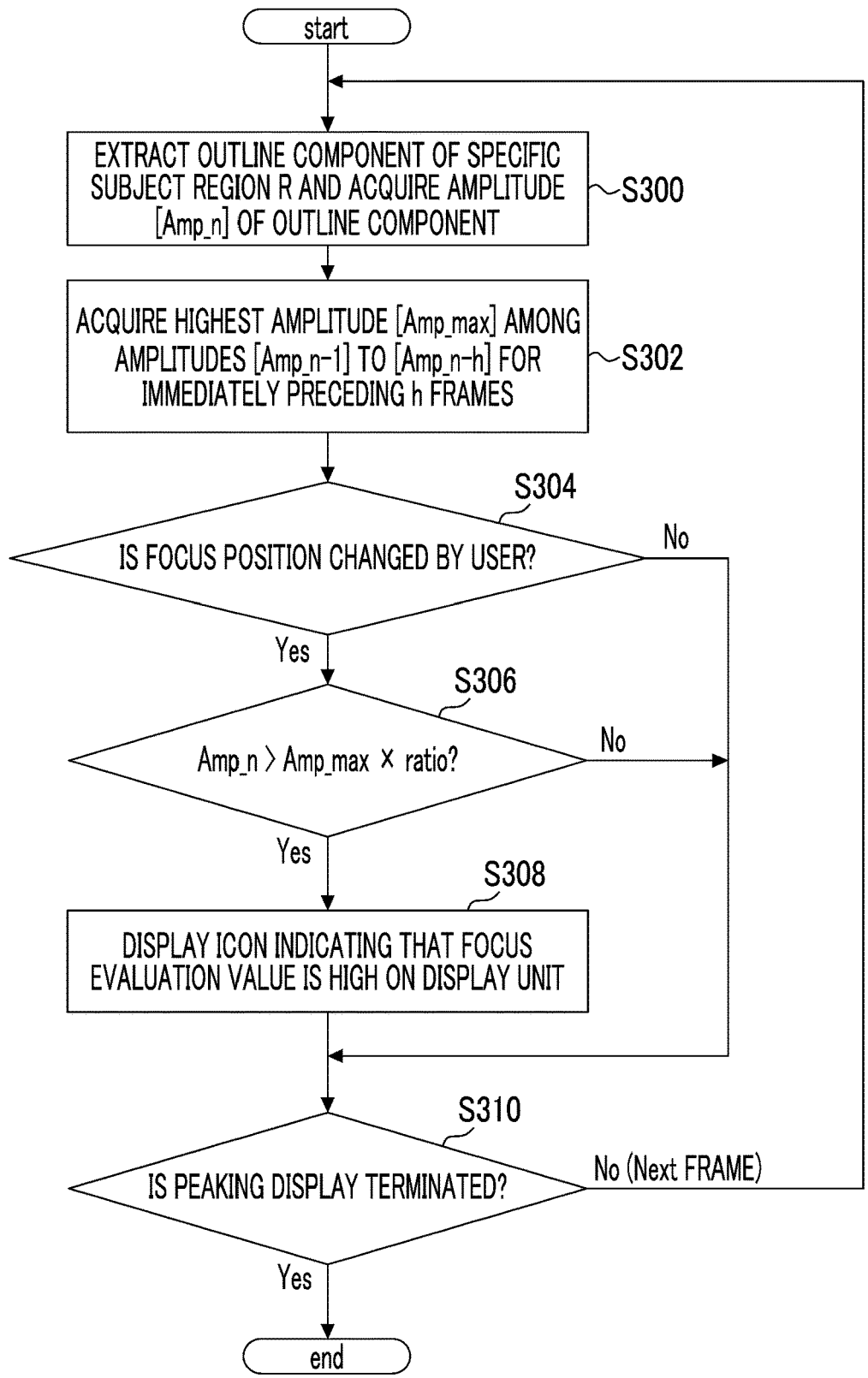
FIG. 12 is a flowchart showing a fourth embodiment of the image processing method according to the present invention.

FIG. 12 is a flowchart showing a fourth embodiment of the image processing method according to the present invention.

The fourth embodiment of the image processing method is different from the first to third embodiments in that, in addition to the peaking display, the user is notified whether or not the focus evaluation value is good, so that the description of the peaking display method will be omitted.

In a case in which the user operates the focus ring to move the focus position of the focus lens while viewing the live view image "with peaking", there are many cases in which the focus lens is moved too much or the focus lens is repeatedly moved back and forth.

In the fourth embodiment of the image processing method, the focus evaluation value is increased during the manual focus, the user is notified that the movement of the focus lens is not necessary, and the focus lens is prevented from being moved too much.

In FIG. 12, the outline component extraction unit 16D of the processor 16 extracts the outline component of the specific subject from the brightness data (Y) of the specific subject region R of the latest frame, and acquires the amplitude [Amp_n] of the outline component (step S300).

The processor 16 acquires the maximum evaluation value that is the maximum value among the focus evaluation values for a most recent plurality of frames. That is, the processor 16 acquires the highest amplitude [Amp_max] among the amplitudes [Amp_n-1] to [Amp_n-h] of the outline component for most recent h frames (step S302). It is preferable that the h frames be the number of frames corresponding to a time for rotating the focus ring in one direction during the manual focus.

Subsequently, the processor 16 determines whether or not the user operates the focus ring to change the focus position of the focus lens (step S304). In a case in which it is determined that the focus position is changed (in a case of "Yes"), the processor 16 determines whether or not the focus evaluation value (amplitude [Amp_n]) of the latest frame acquired in step S300 exceeds an allowable value set based on the maximum evaluation value (amplitude [Amp_max]) acquired in step S302. Here, the allowable value is a value (Amp_max*ratio) obtained by multiplying the maximum amplitude [Amp_max] by a fixed ratio.

In a case in which the amplitude [Amp_n] of the latest frame exceeds the allowable value (Amp_max*ratio) (in a case of "Yes"), the processor 16 displays notification information (for example, an icon) indicating that the focus evaluation value is high on the display unit 20, and notifies the user that the latest frame is in focus (step S308).

On the other hand, in a case in which the amplitude [Amp_n] of the latest frame does not exceed the allowable value (Amp_max*ratio) (in a case of "No"), the processor 16 transitions to step S310 without performing the processing of step S308.

In step S310, it is determined whether or not to terminate the peaking display. In a case in which it is determined not to terminate the peaking display (in a case of "No"), the processing transitions to step S300, and the processing of step S300 to step S310 is repeated for the next frame.

According to the fourth embodiment of the image processing method, in a case in which the focus evaluation value of the latest frame exceeds the allowable value during a manual focus period, the user is notified that the focus evaluation value is high, so that the focus lens can be prevented from being moved too much due to the manual focus.

Others

The second moving image data for display according to the present embodiment is the moving image data in which the peaking processing is performed on the specific subject region and the focus state of the specific subject is visually recognizable. However, the present invention is not limited to this, and the moving image data in which the focus state of the specific subject is visually recognizable by a method other than the peaking processing may be adopted. As the method other than the peaking processing, for example, there is a method of intentionally blurring the specific subject region in accordance with the evaluation result of the focus state, changing a display form of a frame surrounding the specific subject, or the like. In short, the moving image data in which the focus state of the specific subject can be easily confirmed need only be generated.

In addition, the focus evaluation value indicating the evaluation result of the focus state of the specific subject is not limited to the amplitude of the outline component of the specific subject. For example, an integrated value of an absolute value of high-frequency components of the moving image data of the specific subject region or phase difference data obtained from phase difference pixels of the specific subject region in a case in which the imaging element has the phase difference pixels can be used as the focus evaluation value.

In the present embodiment, for example, the hardware structures of the processing units that executes various processing of the processor 16 are the following various processors. The various processors include the central processing unit (CPU), which is a general-purpose processor that executes the software (program) and functions as the various processing units, a programmable logic device (PLD), which is a processor of which a circuit configuration can be changed after manufacture, such as a field programmable gate array (FPGA), and a dedicated electric circuit, which is a processor having a circuit configuration that is designed for exclusive use in order to execute specific processing, such as an application specific integrated circuit (ASIC).

One processing unit may be composed of one of these various processors, or may be composed of two or more same types or different types of processors (for example, a plurality of FPGAs or a combination of a CPU and an FPGA). In addition, a plurality of the processing units may be composed of one processor. As an example in which the plurality of processing units are composed of one processor, first, there is a form in which one processor is composed of a combination of one or more CPUs and software, and this processor functions as the plurality of processing units, as represented by a computer, such as a client or a server. Second, as represented by a system on chip (SoC) or the like, there is a form of using a processor that realizes the functions of the entire system including the plurality of processing units with one integrated circuit (IC) chip. In this way, various processing units are composed of one or more of the various processors described above as the hardware structures.

Further, the hardware structures of these various processors are, more specifically, an electric circuit (circuitry) in which the circuit elements, such as semiconductor elements, are combined.

In addition, the present invention also includes the image processing program that causes the computer to function as the image processing apparatus according to the embodiment of the present invention by being installed in the computer, and a non-volatile storage medium in which the image processing program is recorded.

Further, the present invention is not limited to the embodiments described above, and various modifications can be made without departing from the spirit of the present invention.

EXPLANATION OF REFERENCES

10: imaging apparatus
12: imaging lens
14: imaging unit 14
16: processor
16A: white balance correction processing unit
16B: demosaicing processing unit
16C: brightness/color difference conversion processing unit
16D: outline component extraction unit
16E: outline enhancement processing unit
16F: specific subject region setting unit 16G: combination processing unit
16H: compression processing unit
18: memory
20: display unit
22: input/output interface
22A: recording unit
22B: second connection unit
22C: first connection unit
24: operation unit
R: specific subject region
S10 to S30, S100 to S114, S200 to S222, S300 to S310: step

What is claimed is:

1. An image processing apparatus comprising:
a memory; and
a processor configured to perform:
processing of generating first moving image data based on input imaging data;
processing of setting a specific subject region including a specific subject in an imaging region represented by the imaging data or the first moving image data;
processing of evaluating a focus state based on the imaging data or the first moving image data;
processing of generating second moving image data in which a focus state of the specific subject region is visually recognizable based on data of the specific subject region, an evaluation result of the focus state, and the first moving image data; and
processing of outputting the second moving image data to a display destination,
wherein the processor
acquires a focus evaluation value indicating an evaluation result of a focus state of the specific subject to acquire a maximum evaluation value which is a maximum value among the focus evaluation values for most recent plurality of frames, and
outputs notification information indicating that the focus state of the specific subject in a latest frame is good to the display destination in a case in which a focus evaluation value of the latest frame exceeds an allowable value set based on the maximum evaluation value during a manual focus period.

2. The image processing apparatus according to claim 1, wherein the second moving image data is moving image data in which the focus state of only the specific subject region is visually recognizable.

3. The image processing apparatus according to claim 1, wherein, in the processing of generating the second moving image data, the second moving image data is generated by performing processing of adding data based on the evaluation result of the focus state to the specific subject region represented by the data of the specific subject region in the imaging region represented by the first moving image data.

4. The image processing apparatus according to claim 1, wherein the processor generates third moving image data including an evaluation result of a focus state of the specific subject based on the imaging data or the first moving image data, and generates the second moving image data based on the specific subject region, the first moving image data, and the third moving image data.

5. The image processing apparatus according to claim 4, wherein the processor generates the second moving image data by combining the first moving image data excluding the specific subject region with the third moving image data of the specific subject region.

6. The image processing apparatus according to claim 1, wherein the processing of evaluating the focus state is processing of extracting an outline component of a subject based on the imaging data or the first moving image data and performing outline enhancement processing in accordance with an amplitude of the extracted outline component on the first moving image data.

7. The image processing apparatus according to claim 6, wherein the outline enhancement processing is processing of adding a specific color to a portion in which the amplitude of the extracted outline component exceeds a first threshold value and/or changing a density of the specific color in accordance with the amplitude of the outline component.

8. The image processing apparatus according to claim 1, wherein the processor sets the specific subject region based on instruction input of the specific subject by a user.

9. The image processing apparatus according to claim 8, wherein the processor detects movement of the specific subject, and changes the specific subject region in accordance with the movement of the specific subject.

10. The image processing apparatus according to claim 1, wherein the processor alternately outputs the first moving image data and the second moving image data to the display destination for each first time.

11. An imaging apparatus comprising:
an imaging unit that outputs the imaging data; and
the image processing apparatus according to claim 1.

12. An image processing method of generating moving image data for supporting manual focus by an image processing apparatus including a processor and a memory, the method comprising, as processing of the processor:
a step of generating first moving image data based on input imaging data;
a step of setting a specific subject region including a specific subject in an imaging region represented by the imaging data or the first moving image data;
a step of evaluating a focus state based on the imaging data or the first moving image data;
a step of generating second moving image data in which a focus state of the specific subject region is visually recognizable based on data of the specific subject region, an evaluation result of the focus state, and the first moving image data; and
a step of outputting the second moving image data to a display destination,
wherein the processor
acquires a focus evaluation value indicating an evaluation result of a focus state of the specific subject to acquire a maximum evaluation value which is a maximum value among the focus evaluation values for most recent plurality of frames, and
outputs notification information indicating that the focus state of the specific subject in a latest frame is good to the display destination in a case in which a focus evaluation value of the latest frame exceeds an allowable value set based on the maximum evaluation value during a manual focus period.

13. The image processing method according to claim 12, further comprising:
a step of generating third moving image data including an evaluation result of a focus state of the specific subject based on the imaging data or the first moving image data, wherein, in the step of generating the second moving image data, the second moving image data is generated based on the specific subject region, the first moving image data, and the third moving image data.

14. The image processing method according to claim 13, wherein, in the step of generating the second moving image data, the second moving image data is generated by combining the first moving image data excluding the specific subject region with the third moving image data of the specific subject region.

15. A non-transitory, computer-readable tangible recording medium, which records thereon a program for causing, when read by a computer, the computer to realize:
- a function of generating first moving image data based on input imaging data;
- a function of setting a specific subject region including a specific subject in an imaging region represented by the imaging data or the first moving image data;
- a function of evaluating a focus state based on the imaging data or the first moving image data;
- a function of generating second moving image data in which a focus state of the specific subject region is visually recognizable based on data of the specific subject region, an evaluation result of the focus state, and the first moving image data;
- a function of outputting the second moving image data to a display destination;
- a function of acquiring a focus evaluation value indicating an evaluation result of a focus state of the specific subject to acquire a maximum evaluation value which is a maximum value among the focus evaluation values for most recent plurality of frames; and
- a function of outputting notification information indicating that the focus state of the specific subject in a latest frame is good to the display destination in a case in which a focus evaluation value of the latest frame exceeds an allowable value set based on the maximum evaluation value during a manual focus period.

* * * * *